United States Patent [19]

Takanashi et al.

[11] Patent Number: 5,337,078
[45] Date of Patent: Aug. 9, 1994

[54] APPARATUS AND METHOD FOR RECORDING INFORMATION CARRIED BY ELECTRO-MAGNETIC RADIATION BEAM

[75] Inventors: Itsuo Takanashi, Kamakura; Shintaro Nakagaki, Miura; Tsutou Asakura; Masato Furuya, both of Yokohama; Yoshihisa Koyama, Yokosuka; Yuji Uchiyama, Chigasaki, all of Japan

[73] Assignee: Victor Company of Japan, Ltd., Yokohama, Japan

[21] Appl. No.: 886,286

[22] Filed: May 21, 1992

[30] Foreign Application Priority Data

May 22, 1991 [JP] Japan .................. 3-146745

[51] Int. Cl.$^5$ .................. H04N 1/21; B41J 2/435
[52] U.S. Cl. .................. 346/108; 346/160; 359/72; 347/53
[58] Field of Search .................. 346/1.1, 107 R, 108, 346/160; 250/214 LA; 359/72

[56] References Cited

U.S. PATENT DOCUMENTS 5,150,226 9/1992 Takanashi et al. .................. 358/471
5,191,408 3/1993 Takanashi et al. .................. 359/72

Primary Examiner—Mark J. Reinhart
Attorney, Agent, or Firm—Jacobson, Price, Holman & Stern

[57] ABSTRACT

An apparatus for recording information carried by an electro-magnetic radiation beam. The apparatus has a recording unit having two electrodes, a photoconductive member and a recording member of liquid crystals capable of holding electric charges, the members being arranged so as to face each other between the electrodes. An electro-magnetic radiation beam carrying information to be recorded is directed to the photoconductive member under presence of a voltage across the electrodes. An electric field corresponding to a conductivity variation of the photoconductive member according to the information is thus applied to the recording member to form a charge latent image corresponding to the information on the recording member. The recording member is then heated so that an intensity of the applied electric field exceeds a specific threshold level at which an optical characteristic of the liquid crystal begins to vary according to the charge latent image. Therefore, the information is recorded in the recording member as the optical characteristic variation.

3 Claims, 4 Drawing Sheets

APPARATUS AND METHOD FOR RECORDING INFORMATION CARRIED BY ELECTRO-MAGNETIC RADIATION BEAM

BACKGROUND OF THE INVENTION

The present invention relates to an apparatus and a method for performing information recording using light (including various types of electro-magnetic radiation beams) with respect to a recording medium which stores information, and in particular, to an improved developing process for recording media.

Recording apparatus with respect to recording media which store information include for example, that shown in FIG. 1. In this figure, a recording medium 10 is configured with a recording member 16 laminated onto a transparent substrate 12 via a transparent electrode 14. A write head 20 is configured with a photoconductive member 26 laminated onto a transparent substrate 22 via a transparent electrode 24. Then, the recording medium 10 and the write head 20 are arranged so that the photoconductive member 26 is opposite the recording member 16.

Between the transparent electrodes 14 and 24 there is a drive power source 30 connected via a switch 32. To the side of the transparent substrate 22 of the write head 20 there are arranged an optical shutter 34 and a taking lens 36. In addition, there is another drive power source 40 which impresses a voltage to the switch 32 and the optical shutter 34 via a switch 38 so that the switch 32 and the optical shutter 34 are operated.

Glass substrates for example, are used as the transparent substrates 12 and 22. In addition indium-tin oxide for example, is used as the transparent electrodes 14 and 24. The recording member 16 is capable of having a charge image formed on its surface for a long time in accordance with an impressed electric field and of photomodulation according to the charge image. For example, it is possible to apply silicone resin, liquid crystal, lead lanthanum zirconate titanate, an electrochromic material or the like to the recording member 16. A polymer-dispersed liquid crystal memory is also applicable to the recording member 16. The photoconductive member 26 is made of a photoconductive material such as a-Si or the like so that a charge image corresponding to information is formed when light carrying the information to be recorded is irradiated to the photoconductive member 26.

The following is an outline description of the recording operation in the recording apparatus having the configuration described above. When the switch 38 is switched to its ON state, a voltage of the drive power source 40 is impressed to the switch 32 and the optical shutter 34 to operate. Because of this, a voltage of the drive power source 30 is impressed across the transparent electrodes 14 and 24, and the optical shutter 34 opens, so that light carrying image information of an object 42 is irradiated to the photoconductive member 26 of the write head 20 via the taking lens 36 and the optical shutter 34. By this, the photoconductive member 26 exhibits conductivity distribution corresponding to the intensity of the irradiated light.

When this occurs, the drive voltage which is impressed across the transparent electrodes 14 and 24 is fractionally and variably impressed to the recording member 16 in accordance with the conductivity distribution of the photoconductive member 26. A charge image corresponding to the image information of the object 42 is thus formed on the surface of the recording member 16. By this, the image information of the object 42 is recorded as changes in the variation of optical transmittivity on the recording member 16 if including liquid crystals.

FIG. 2 shows the characteristics graph of the recording operation described above. First, the relationship between the optical transmittivity of the irradiated light and the impressed voltage in the recording member 16 is as shown by the graph GA. In addition, the relationship between the exposure amount in the photoconductive member 26 and the voltage which is impressed to the recording member 16 by the exposure amount is as shown by graphs GB and GC. B1 and B2 are the dark potential.

The exposure range with respect to the photoconductive member 26 is made EW. In the case of the graph GB, the voltage which is impressed to the recording member 16 by the photoconductive member 26 is in agreement with the variation of the optical transmittivity (as shown by dotted line arrows FA and FA). Because of this, the optical image of the object 42 is favorably recorded to the recording member 16.

However, when the characteristics of the photoconductive member 26 is as shown by the graph GC, the voltage which is impressed to the recording member 16 by the photoconductive member 26 has the range shown by dotted line arrows FB and FB. More specifically, the voltage impressed with respect to the recording member 16 does not attain a threshold value SV, and there is no variation of the optical transmittivity on the recording member 16. Therefore, when a photoconductive member with a low dark potential is used there is no recording of the optical image of the object 42.

Accordingly, a photoconductive member having a high dark potential could be used but when such a photoconductive member is used, it is likely to generate unevenness in the dark potential and thus there is the resultant influence of shading due to the unevenness.

SUMMARY OF THE INVENTION

In the light of this problem, the present invention has as an object the provision of the apparatus which can favorably perform information recording even in the case when a photoconductive member having a low dark potential is used and the method thereof.

To achieve the above object, the present invention provides an apparatus for recording information carried by an electro-magnetic radiation beam, the apparatus comprising: a recording unit comprising two electrodes, a photoconductive member and a recording member of liquid crystals capable of holder electric charges, the members being arranged so as to face each other between the electrodes; means for applying a specific voltage across the electrodes; means for directing an electric-magnetic radiation beam carrying information to be recorded to the photoconductive member under presence of the voltage so that an electric field corresponding to a conductivity variation of the photoconductive member according to the information is applied to the recording member, thus a charge latent image corresponding to the information being formed on the recording member; and means for heating the recording member with the formed charge latent image so that an intensity of the applied electric field exceeds a specific threshold level at which an optical characteristic of the liquid crystal begins to vary according to the charge latent image, thus the information being recorded in the recording member as the optical characteristic variation.

The present invention further provides a method of recording information carried by an electro-magnetic radiation beam, the method comprising the steps of: providing two electrodes, a photoconductive member and a recording member of liquid crystals capable of holding electric charges; arranging the members so as to face each other between the electrodes; applying a specific voltage across the electrodes; directing an electro-magnetic radiation beam carrying information to be recorded to the photoconductive member under presence of the voltage so that an electric field corresponding to a conductivity variation of the photoconductive member is applied to the recording member to form a charge latent image on the recording member; and heating the recording member with the recorded information so that an intensity of the applied electric field exceeds a specific threshold level at which the optical characteristic begins to vary according to the charge latent image, thus the in formation being recorded in the recording member as the optical characteristic variation.

DETAILED DESCRIPTION OF THE PREFERRED EMBODIMENTS

The following is a description of a preferred embodiment of the present invention, with reference to the appended drawings. Moreover, those portions of the configuration which correspond to portions of the conventional apparatus, are indicated with corresponding numerals.

Figure 1:
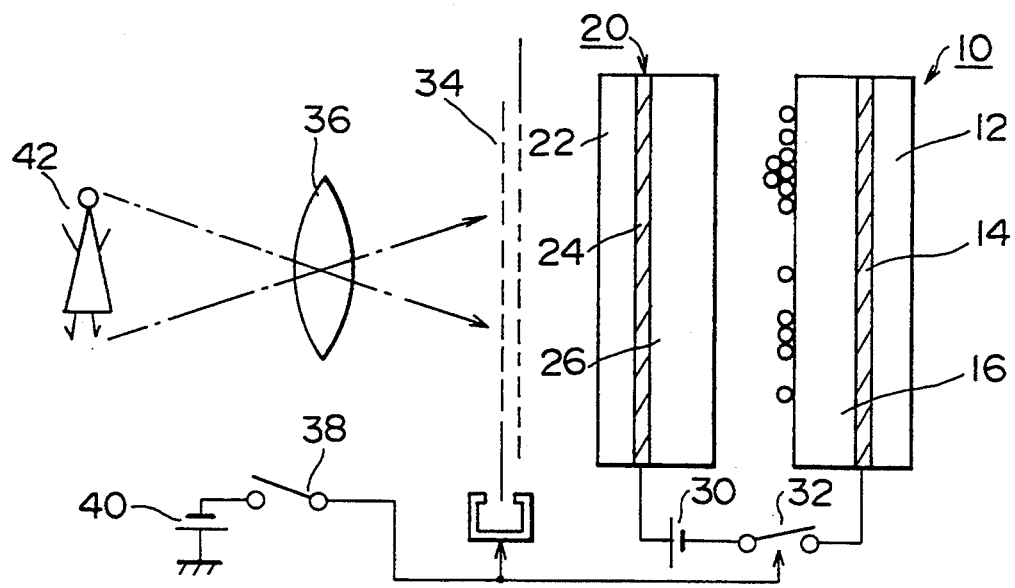
FIG. 1 is a view describing a conventional recording apparatus.
Figure 3:
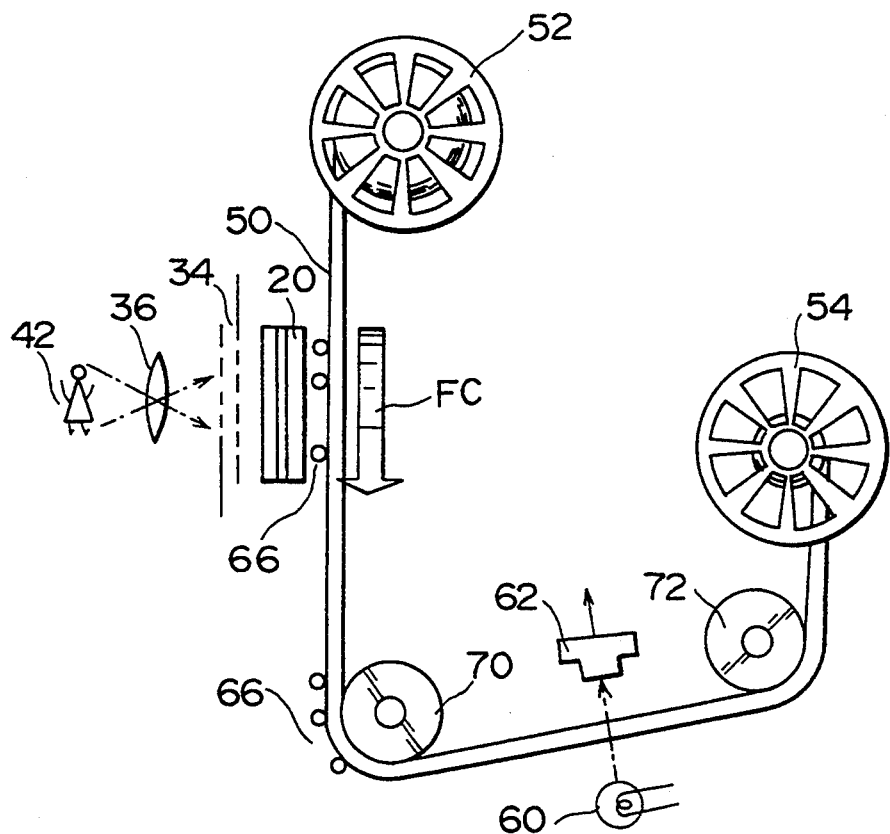
FIG. 3 is a view showing a configuration of an embodiment of the present invention.

In FIG. 3, a sheet-type of recording medium 50 including liquid crystals in its recording member 16 is supplied from a supply reel 52 and is wound up by a takeup reel 54. These reels are intermittently fed by a drive means not shown in the figure. The write head 20, the optical shutter 34 and the taking lens 36 shown in FIG. 1 are individually arranged so as to oppose the recording medium 50, and these perform the formation of the charge image corresponding to the optical image of the object 42. Moreover, as described with respect to FIG. 1, there are drive power sources 30 and 40 and switches 32 and 38 provided in this embodiment but they are not shown in FIG. 3.

A heating roller 70 is provided as a developing means for developing the information which is recorded to the recording medium 50, and a heat discharge roller 72 is provided after the heating roller 70 to allow heat applied to the recording medium 50 to escape therefrom.

Internal to the heating roller 70 is incorporated a heat generating element (a resistor) which heats the roller 70 when current is passed through it.

The heat discharge roller 72 is configured by a material (metal) having a good thermal conductivity. When this heat discharge roller 72 is brought into contact with the recording medium 50, the heat inside the recording medium 50 is transmitted to the roller 72 and is discharged. The heat discharge from the heat discharge roller 72 itself is performed by natural cooling since the heat discharge roller 72 rotates. Here, the cooling can be at room temperature.

In addition, a light source 60 and a photodetector 62 for read or reproduction of the recorded information are provided opposite each other as the recording medium 50 is interposed therebetween.

Figure 4:
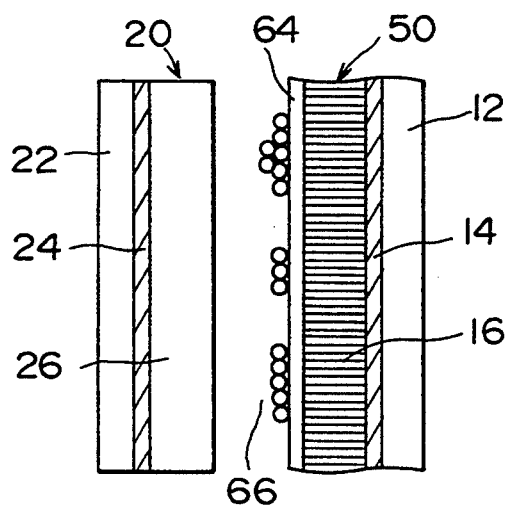
FIG. 4 is an enlarged view describing main operations of the embodiment.

On the recording member 16 of the recording medium 50 is provided a charge holding layer 64 as shown in FIG. 4, so that a charge latent image is formed on the surface of this charge holding layer 64. The charge holding layer 64 may be omitted if the recording member 16 has a high impedance so that the recording member 16 can hold a charge latent image.

The following is a description of the operation of the embodiment having the configuration described above. Operation the same as that described with reference to FIG. 1 is performed to form a charge latent image corresponding to the image of the object 42 on the surface of the recording medium 50. FIG. 4 shows an enlarged view of this, and a charge latent image 66 is formed on the portion of the charge holding layer 64 of the recording medium 50 which opposes the photoconductive member 26.

Figure 2:
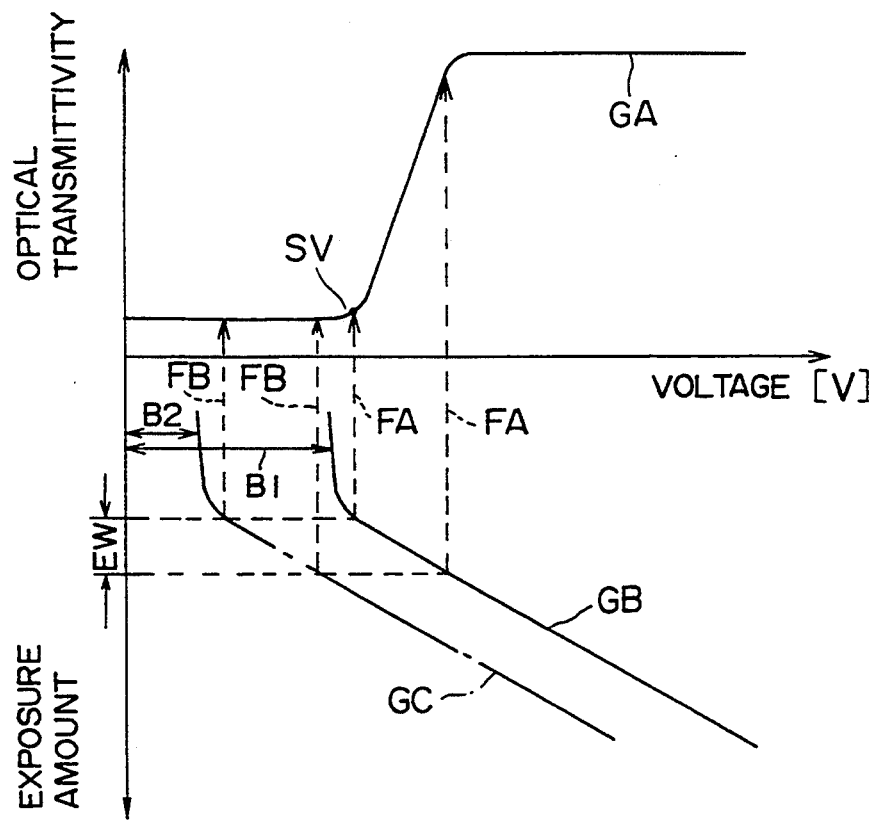
FIG. 2 is a graph showing the relationship between the characteristic of the photoconductive member and the characteristic of the recording member.

However, as shown by the arrows FB and FB in the graph GC of FIG. 2, there is no change in the optical transmittivity of the recording member 16 if the photoconductive member 26 of the write head 20 has a low dark potential. The recording medium 50 on which is formed the charge latent image 66 is fed in the direction of an arrow FC, and the portion of the recording medium 50 on which the latent image is formed is brought into contact with the heating roller 70.

Figure 5:
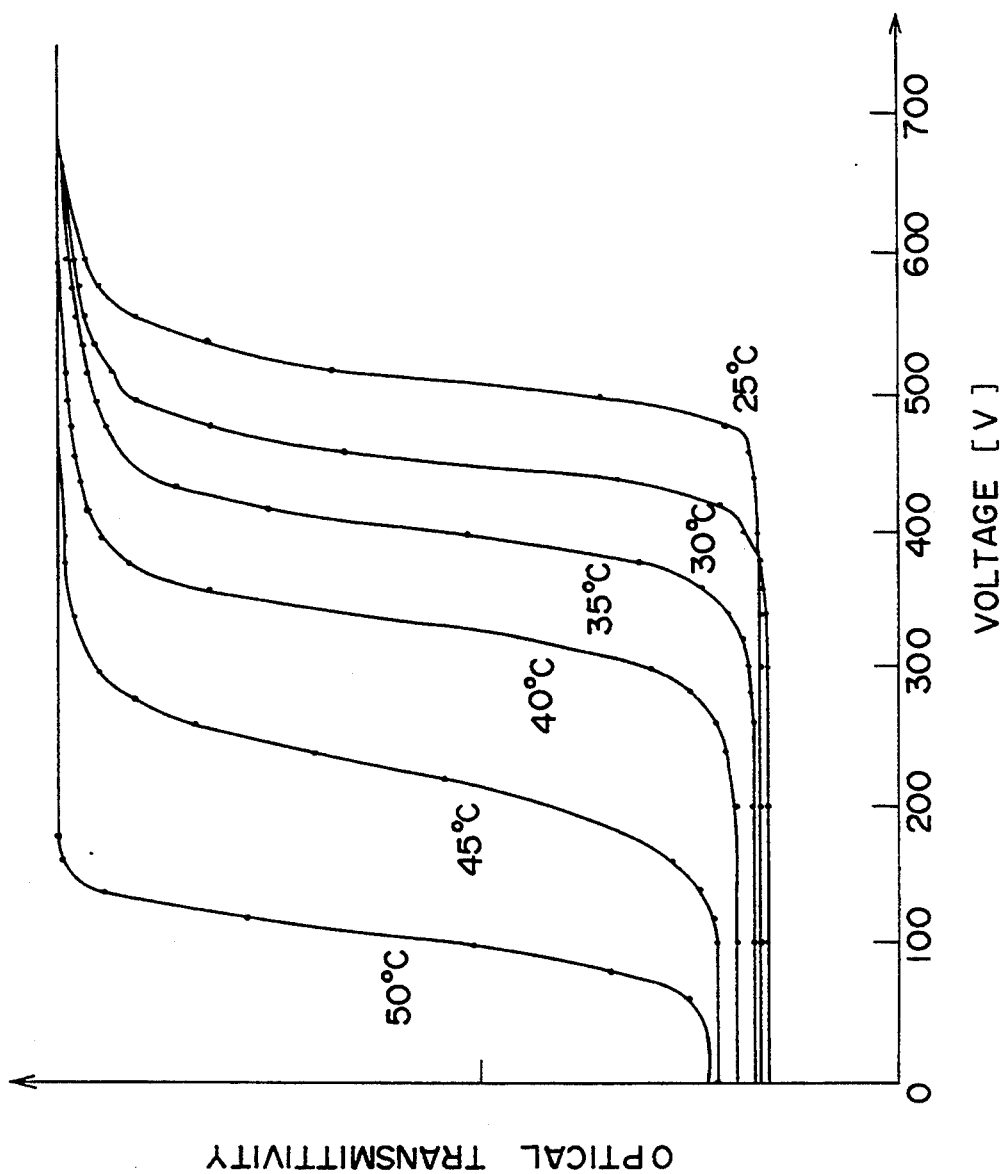
FIG. 5 is a graph showing the variation of the optical transmittivity of the recording member in the embodiment.
Figure 6A:
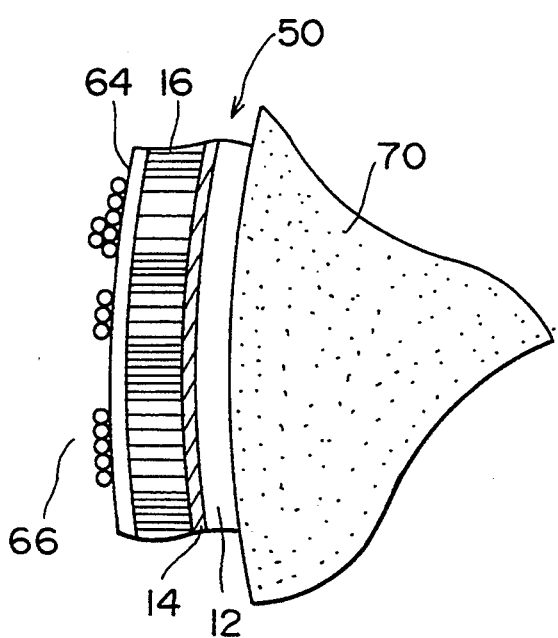
FIGS. 6A and 6B are enlarged views showing further main operations of the embodiment.

Heating by the heating roller 70 is then performed with respect to the recording medium 50. When a polymerdispersed liquid crystal memory is used as the recording member 16, this heating causes the characteristic of the recording member 16 to vary as shown in FIG. 5, and a threshold value of this optical transmittivity variation drops for the higher a heating temperature with respect to the recording member 16. Because of this the optical transmittivity of the recording member 16 varies by the electric field due to the charge latent image 66 and developing is thus performed. FIG. 6A shows an enlarged view of this.

The light source 60 is used to irradiate read light to the recording medium 50 on which information has been recorded in the manner described above. The read light is modulated due to the optical transmittivity of the portion of the recording medium 50 the portion being irradiated with the read light, and the modulated read light is applied to the photodetector 62. This modulated read light undergoes photoelectric conversion by the photodetector 62 and electrical signals corresponding to the optical image of the object 42 are outputted.

In this manner, the present embodiment can perform the favorable recording of information using a photoconductive member having a low dark potential since the electric field of the recording member 16 exceeds the threshold value SV because of the heating roller 70.

Figure 6B:
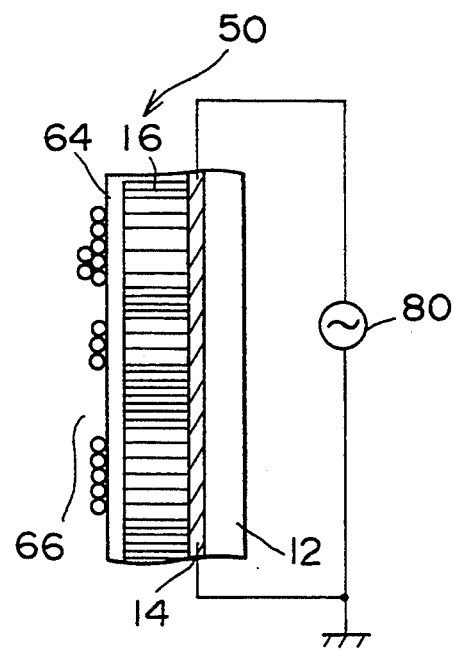

Moreover, as shown in FIG. 6B, the heating means for the recording member 16 can perform heating of the recording member 16 by allowing a current to flow to the electrode 14 by a power source 80, or through joule heat by electrode resistance of the electrode 14. In either method, the heating temperature is set to be lower than the transition temperature of the liquid crystals of the recording member 16.

Moreover, the present invention is not limited to the embodiment described above, and for example can include the following.

(1) The recording medium can be tape, sheets, disks, cards or any necessary form, and the transfer status can be suitably changed in accordance with the form of the recording medium with rotation, conversion or the like. The recording member of the recording medium and the photoconductive member of the write head can be brought into contact. Reading of the information which is recorded can be performed by light reflected from a suitably reflective film formed on the recording medium. In addition, the read operation can be performed arbitrarily either at the same time as the developing or some other time.

(2) Furthermore, the irradiation of the light that includes the formation, to the photoconductive member at the time of recording operation can be performed in a plane, or by scanning light in dots or lines.

(3) In addition, the configuration of a light irradiation system can be suitably changed in accordance with necessity. Combinations of the above modifications are also possible.

As has been described above, according to the embodiments of the present invention, developing of a change latent image is performed by the impressing of heat and so it is possible to favorably perform the recording of information even if a photoconductive member having a low dark potential is used, and it is possible to reduce the influence of shading which occurs when a photoconductive member having a high dark potential is used.

What is claimed is:

1. An apparatus for recording information carried by an electro-magnetic radiation beam, the apparatus comprising:
    a recording unit comprising two electrodes, a photoconductive member and a recording member of liquid crystals capable of holding electric charges, the members being arranged so as to face each other between the electrodes;
    means for applying a specific voltage across the electrodes;
    means for directing an electro-magnetic radiation beam carrying information to be recorded to the photoconductive member under presence of the voltage so that an electric field corresponding to a conductivity variation of the photoconductive member according to the information is applied to the recording member, thus a charge latent image corresponding to the information being formed on the recording member; and
    means for heating the recording member with the formed charge latent image so that an intensity of the applied electric field exceeds a specific threshold level at which an optical characteristics of the liquid crystal begins to vary according to the charge latent image, thus the information being recorded in the recording member as the optical characteristic variation.

2. An apparatus according to claim 1, wherein the heating means heats the recording member to a temperature less than a transition temperature of the liquid crystals.

3. A method of recording information carried by an electro-magnetic radiation beam, the method comprising the steps of:
    providing two electrodes, a photoconductive member and a recording member of liquid crystals capable of holding electric charges;
    arranging the members so as to face each other between the electrodes;
    applying a specific voltage across the electrodes;
    directing an electro-magnetic radiation beam carrying information to be recorded to the photoconductive member under presence of the voltage so that an electric field corresponding to a conductivity variation of the photoconductive member is applied to the recording member to form a charge latent image on the recording member; and
    heating the recording member with the recorded information so that an intensity of the applied electric field exceeds a specific threshold level at which the optical characteristic begins to vary according to the charge latent image, thus the information being recorded in the recording member as the optical characteristic variation.

* * * * *